Patented Jan. 19, 1932

1,841,990

UNITED STATES PATENT OFFICE

ALFRED THAUSS, OF COLOGNE-DEUTZ, GUSTAV MAUTHE, OF COLOGNE-HOLWEIDE, AND ARNOLD DOSER, OF COLOGNE-MULHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

MANUFACTURE OF STABLE HIGHLY CHLORINATED TRAIN OILS

No Drawing. Application filed July 11, 1929, Serial No. 377,597, and in Germany July 18, 1928.

The present invention relates to the manufacture of stable highly chlorinated train oils and to new products obtainable thereby.

The highly chlorinated train oils, obtained according to the processes hitherto used by exhaustively chlorinating the same are unstable and continually lose hydrogen chloride even at ordinary temperature. This constitutes a great disadvantage in their technical use.

In accordance with the present invention, stable highly chlorinated train oils are obtained by chlorinating any train oil as obtainable from fishes, for instance the whale and other marine animals, by introducing therein chlorine, until the iodine number is reduced to zero, an indication that all the double bonds of the unsaturated oils are saturated. The process is started at room temperature, but during the chlorination the heat of reaction evolved from the reaction mixture causes the temperature to rise up to 80° C. When the chlorination is complete, there is passed a stream of air or another inert gas, such as nitrogen or hydrogen, through the chlorinated train oil at an elevated temperature of about 50 to 80° C. for 10-20 hours, until only a very faint hydrochloric acid reaction is detectable in the emerging gas.

Then air or another inert gas, such as nitrogen, in mixture with ammonia gas, or the vapor of a volatile amine, that means an amine having a high vapor pressure, for example ethylamine and the like, is passed through the chlorinated mass for several hours, depending on the content of the ammonia or amine in the gas, at room temperature or advantageously at a somewhat elevated temperature, of between about 20–40° C., whereby the last traces of hydrochloric acid present in the train oil are removed. The reaction is complete, when on passing air through the mass, there can no more be detected any trace of hydrochloric acid in the emerging gas.

Finally there is added to the product a very small quantity of a difficultly volatile amine, the best results being obtainable when using an aromatic amine substituted on the nitrogen atom by an aliphatic residue, such as mono-ethylaniline, a methyl-(or ethyl-) naphthylamine; quantities of about 0.1 to 1% of said amines sufficient, which obviously in this case merely play the part of a retarder or anti-catalyst. Generally, we add about 0.5% of an amine.

For the purpose of our invention there may be used any commercial train oils, said train oils being obtained from certain marine animals, such as fishes, the whale, and being glycerides of unsaturated higher fatty acids. These train oils differ chemically somewhat from each other, depending on the specific animal they are obtained from. But the chlorine content of the exhaustively chlorinated products generally amounts to about 30%. For the purpose of the invention, light colored clear train oil of a high iodine number of about 150, low acid number of about 15-40, and of a high saponification number of about 200, have proven particularly suitable.

Our new products generally are yellowish-colored substances, not splitting off hydrogen chloride, being valuable in the manufacture of paints, as binding agents and the like.

The invention is illustrated by the following example, but is not restricted thereto:

Example.—A strong current of chlorine is led at room temperature and with good stirring into 200 parts by weight of a light-colored train oil possessing a high iodine number of about 157, a low acid number of about 17, and a high saponification number of about 200, until, by the heat of reaction evolved, the mass has attained a temperature of from 40-50° C. By regulating the current of chlorine and subsequent gentle heating this temperature is maintained, until after passing in chlorine for about 12-15 hours, chlorine is no longer absorbed, thus appearing in the emerging gases and being tested therein by one of the usual analytical methods. The temperature is then raised to 70° C. Air is passed into the oil, until only a very faint hydrochloric acid reaction is detectable in the emerging gas, that is for several hours, and finally, in order to remove the last remaining traces of hydrochloric acid, for a short time, air containing ammonia. One-half gram of monoethylaniline is added to the finished product.

An average yield of 280 parts by weight is obtained of an odorless, light brown colored, viscous product possessing a pronounced ropy nature and a strong adhesive power. This product no longer loses hydrochloric acid, it remains unchanged on exposure to the air and, on account of these properties, is suitable for numerous technical purposes, for example, as paint, as binding agent and the like.

We claim:

1. The process which comprises chlorinating a train oil between room temperature and about 80° C., until the iodine number is reduced to zero, passing a stream of an inert gas through the chlorinated train oil at a temperature between about 50° C. and 80° C. until only a faint hydrochloric acid reaction is detectable in the emerging gas, then passing a mixture of an inert gas and of a basic reacting substance of the group consisting of ammonia and volatile organic bases through the mass at a temperature between about 20° C. and 40° C., until hydrochloric acid is no more split off on passing air through the chlorinated train, and finally adding about 0.1 to about 1% of a difficulty volatile organic amine to the chlorinated train oil.

2. The process which comprises chlorinating a train oil between room temperature and about 80° C., until the iodine number is reduced to zero, passing a stream of air through the chlorinated train oil at a temperature between about 50° C. and 80° C. for about 10 to 20 hours, then passing a mixture of air and ammonia through the mass at a temperature between about 20° and 40° C., until hydrochloric acid is no more split off on passing air through the chlorinated train, and finally adding about 0.1 to about 1% of an aromatic base, substituted on the nitrogen atom by an aliphatic residue to the chlorinated train oil.

3. The process which comprises chlorinating a train oil between room temperature and about 80° C., until the iodine number is reduced to zero, passing a stream of air through the chlorinated train oil at a temperature between about 50° C. and 80° C. for about 10 to 20 hours, then passing a mixture of air and ammonia through the mass at a temperature between about 20° and 40° C., until hydrochloric acid is no more split off on passing air through the chlorinated train, and finally adding about 0.5% of monoethylaniline to the chlorinated train oil.

4. The process which comprises chlorinating a light colored train oil having an iodine number of about 157, an acid number of about 17, and a saponification number of about 200, between room temperature and about 80° C., until the iodine number is reduced to zero, passing a stream of an inert gas through the chlorinated train oil at a temperature between about 50° C. and 80° C. until only a faint hydrochloric acid reaction is detectable in the emerging gas, then passing a mixture of an inert gas and of a basic reacting substance of the group consisting of ammonia and volatile organic bases through the mass at a temperature between about 20° C. and 40° C., until hydrochloric acid is no more split off on passing air through the chlorinated train, and finally adding about 0.1 to about 1% of a difficultly volatile organic amine to the chlorinated train oil.

5. The process which comprises chlorinating a light colored train oil having an iodine number of about 157, an acid number of about 17, and a saponification number of about 200, between room temperature and about 80° C., until the iodine number is reduced to zero, passing a stream of air through the chlorinated train oil at a temperature between about 50° C. and 80° C. for about 10 to 20 hours, then passing a mixture of air and ammonia through the mass at a temperature between about 20° C. and 40° C., until hydrochloric acid is no more split off on passing air through the chlorinated train, and finally adding about 0.1 to about 1% of an aromatic base substituted on the nitrogen atom by an aliphatic residue, to the chlorinated train oil.

6. The process which comprises chlorinating a light colored train oil having an iodine number of about 157, an acid number of about 17, and a saponification number of about 200, between room temperature and about 80° C., until the iodine number is reduced to zero, passing a stream of air through the chlorinated train oil at a temperature between about 50° C. and 80° C. for about 10 to 20 hours, then passing a mixture of air and ammonia through the mass at a temperature between about 20° C. and 40° C., until hydrochloric acid is no more split off on passing air through the chlorinated train, and finally adding about 0.5% of monoethylaniline to the chlorinated train oil.

7. As a new product a chlorinated train oil being obtained by a process as claimed in claim 1, and being characterized by not splitting off hydrochloric acid, being a yellowish colored substance, valuable in the manufacture of paints and as binding agent.

8. As a new product a chlorinated train oil being obtained by a process as claimed in claim 2, and being characterized by not splitting off hydrochloric acid, being a yellowish colored substance, valuable in the manufacture of paints and as binding agent.

9. As a new product a chlorinated train oil being obtained by a process as claimed in claim 3, and being characterized by not splitting off hydrochloric acid, being a yellowish colored substance, valuable in the manufacture of paints and as binding agent.

10. As a new product a chlorinated train oil being obtained by a process as claimed in claim 4, and being characterized by not splitting off hydrochloric acid, being a yellowish colored substance, valuable in the manufacture of paints and as binding agent.

11. As a new product a chlorinated train oil being obtained by a process as claimed in claim 5, and being characterized by not splitting off hydrochloric acid, being a yellowish colored substance, valuable in the manufacture of paints and as binding agent.

12. As a new product a chlorinated train oil being obtained by a process as claimed in claim 6, and being characterized by not splitting off hydrochloric acid, being a yellowish colored substance, valuable in the manufacture of paints and as binding agent.

In testimony whereof we have hereunto set our hands.

ALFRED THAUSS.  [L. S.]
GUSTAV MAUTHE.  [L. S.]
ARNOLD DOSER.   [L. S.]